United States Patent
Sprowitz et al.

(10) Patent No.: US 12,459,113 B2
(45) Date of Patent: Nov. 4, 2025

(54) ROBOT LEG AND ROBOTIC SYSTEM

(71) Applicant: MAX-PLANCK-GESELLSCHAFT ZUR FÖRDERUNG DER WISSENSCHAFTEN E.V., Munich (DE)

(72) Inventors: Alexander Sprowitz, Stuttgart (DE); Alborz Aghamaleki Sarvestani, Stuttgart (DE)

(73) Assignee: MAX-PLANCK-GESELLSCHAFT ZUR FÖRDERUNG DER WISSENSCHAFTEN E.V., Munich (DE)

( * ) Notice: Subject to any disclaimer, the term of this patent is extended or adjusted under 35 U.S.C. 154(b) by 1001 days.

(21) Appl. No.: 17/429,163

(22) PCT Filed: Jan. 20, 2020

(86) PCT No.: PCT/EP2020/051249
§ 371 (c)(1),
(2) Date: Aug. 6, 2021

(87) PCT Pub. No.: WO2020/169285
PCT Pub. Date: Aug. 27, 2020

(65) Prior Publication Data
US 2022/0089234 A1    Mar. 24, 2022

(30) Foreign Application Priority Data
Feb. 18, 2019   (EP) .................... 19157793

(51) Int. Cl.
*B25J 9/10*     (2006.01)
*B25J 13/08*    (2006.01)
(Continued)

(52) U.S. Cl.
CPC ............. *B25J 9/1075* (2013.01); *B25J 9/109* (2013.01); *B25J 13/088* (2013.01); *B62D 57/032* (2013.01); *B25J 17/00* (2013.01)

(58) Field of Classification Search
CPC ......... B25J 9/1075; B25J 17/00; B62D 57/02; B62D 57/032; A61H 2003/007; A61H 2003/043
(Continued)

(56) References Cited

U.S. PATENT DOCUMENTS 9,486,919 B1    11/2016 Thorne et al.
10,406,676 B2 *  9/2019 Smith ................ B25J 9/104
(Continued)

FOREIGN PATENT DOCUMENTS

CN    201128445    * 10/2008 ........... B62D 57/032
CN    104139811 A    11/2014
(Continued)

OTHER PUBLICATIONS

English translation of CN201128445 (Year: 2008).*
(Continued)

*Primary Examiner* — Anne Marie M Boehler
(74) *Attorney, Agent, or Firm* — Bochner PLLC; Andrew Bochner

(57) ABSTRACT

The invention relates to a robot leg comprising at least two joints, each joint connecting two segments one to another, with each joint comprising a cam, the robot leg further comprising at least one actuator and a common tendon interconnecting each cam.

18 Claims, 13 Drawing Sheets

Figure 1:
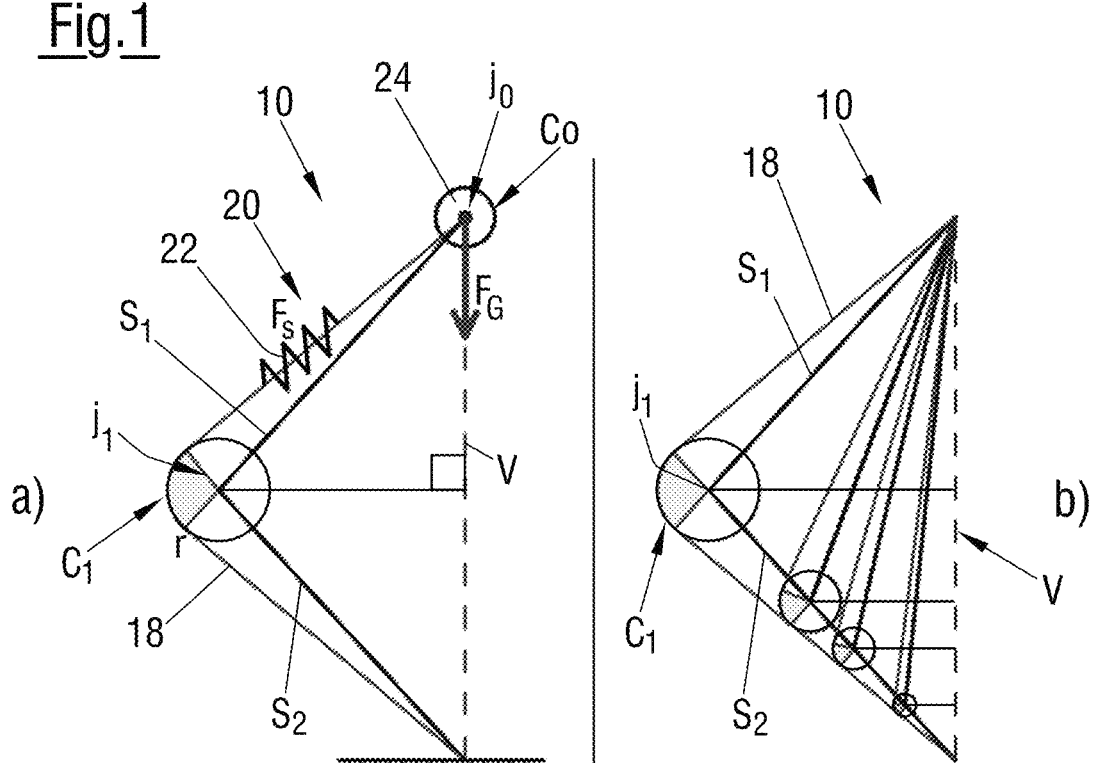

(51) Int. Cl.
  *B25J 17/00* (2006.01)
  *B62D 57/032* (2006.01)
(58) Field of Classification Search
  USPC ..................................... 180/8.5, 8.6; 901/1
  See application file for complete search history.

(56) References Cited

U.S. PATENT DOCUMENTS

| | | |
|---|---|---|
| 2009/0107281 A1 | 4/2009 | Wyrobek |
| 2011/0040216 A1 | 2/2011 | Herr |
| 2013/0192406 A1 | 8/2013 | Godowski |
| 2013/0245524 A1* | 9/2013 | Schofield .............. A61F 5/0125 602/26 |
| 2016/0288848 A1 | 10/2016 | Hurst |
| 2016/0347387 A1 | 12/2016 | Hurst |
| 2020/0130174 A1* | 4/2020 | Kawanami .............. F16H 21/16 |
| 2020/0324411 A1* | 10/2020 | Li ........................ B62D 57/032 |
| 2023/0098713 A1* | 3/2023 | Smith .................. B25J 19/0012 74/490.05 |

FOREIGN PATENT DOCUMENTS

| | | |
|---|---|---|
| CN | 105346620 B | 11/2017 |
| CN | 207292191 U | 5/2018 |

OTHER PUBLICATIONS

Spröwitz, A. et al.; Towards dynamic trot gait locomotion: Design, control, and experiments with Cheetah-cub, a compliant quadruped robot, 19 pages.

Roozing, W. et al.; "Design Optimisation and Control of Compliant Actuation Arrangements in Articulated Robots for Improved Energy Efficiency"; IEEE Robotics and Automation Letters (vol. 1, Issue 2, Jul. 2016), 2 pages.

International Search Report and The Written Opinion of the International Searching Authority in International Appl. No. PCT/EP2020/051249, dated Apr. 23, 2020, 14 pages.

Search Report of the European Patent Office in Appl. No. EP 19157793, dated Jul. 29, 2019, 8 pages.

Office Action of the Japan Patent Office in related Japanese Patent Appl. No. 2021-545788, dated Jan. 9, 2024, 9 pages.

* cited by examiner

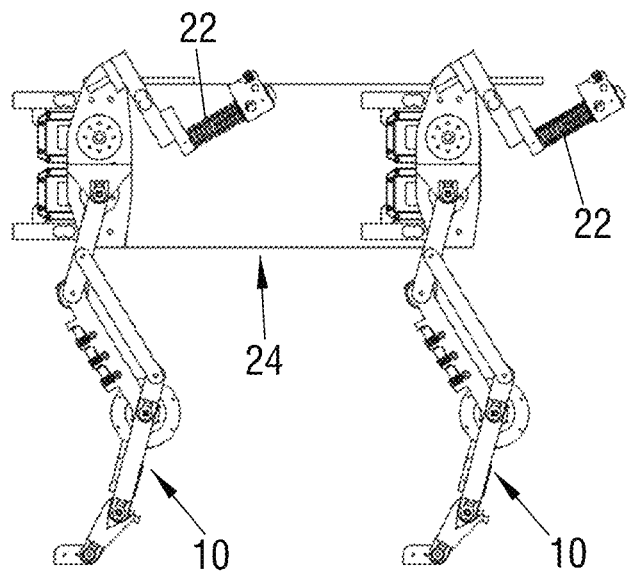
Fig.12a
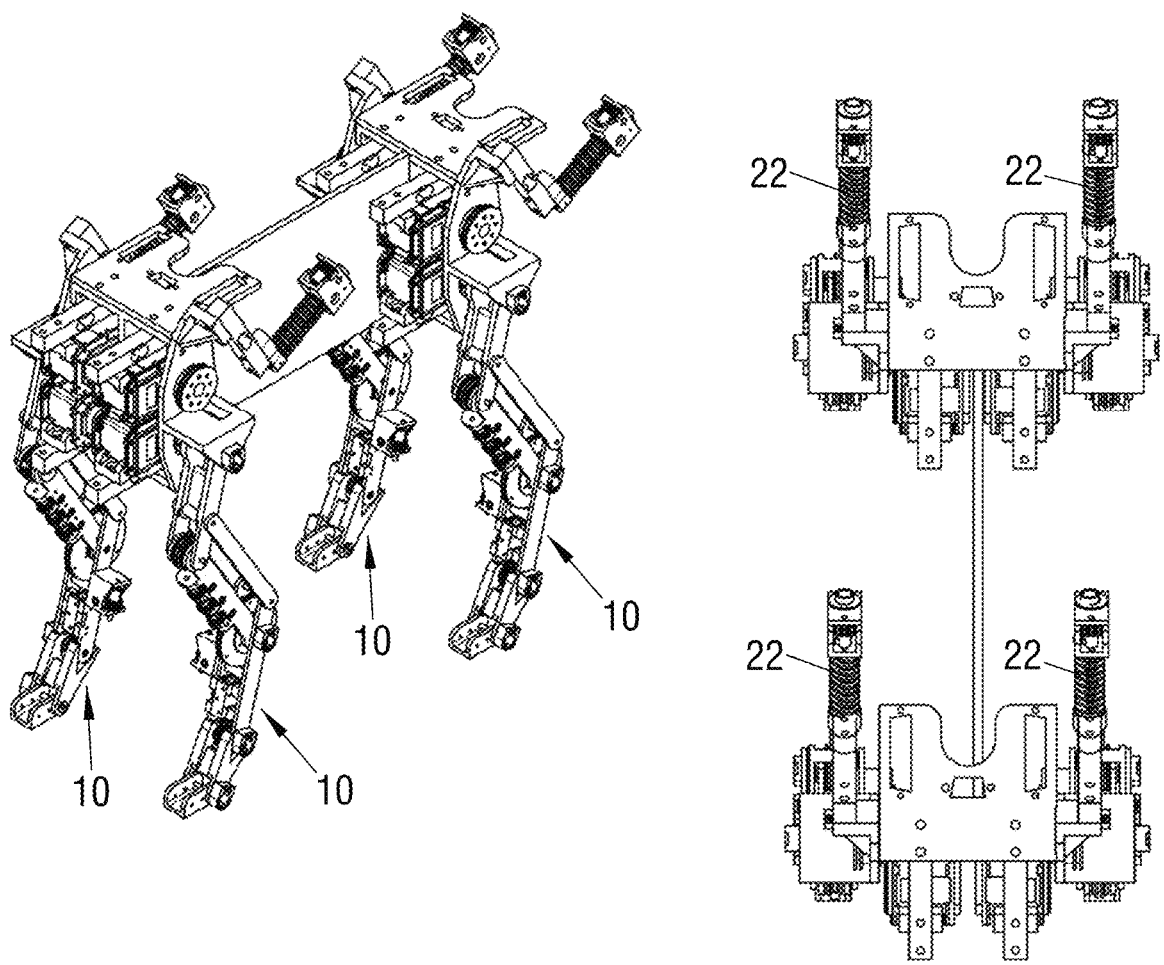

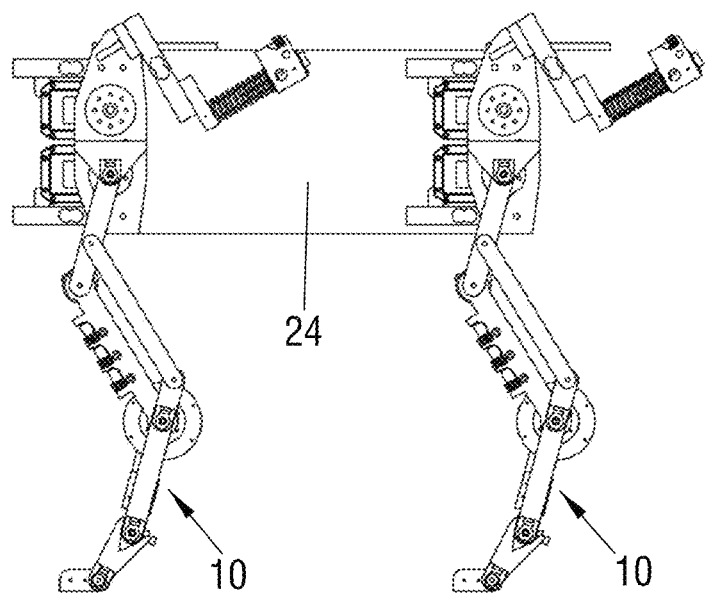
Fig.12b
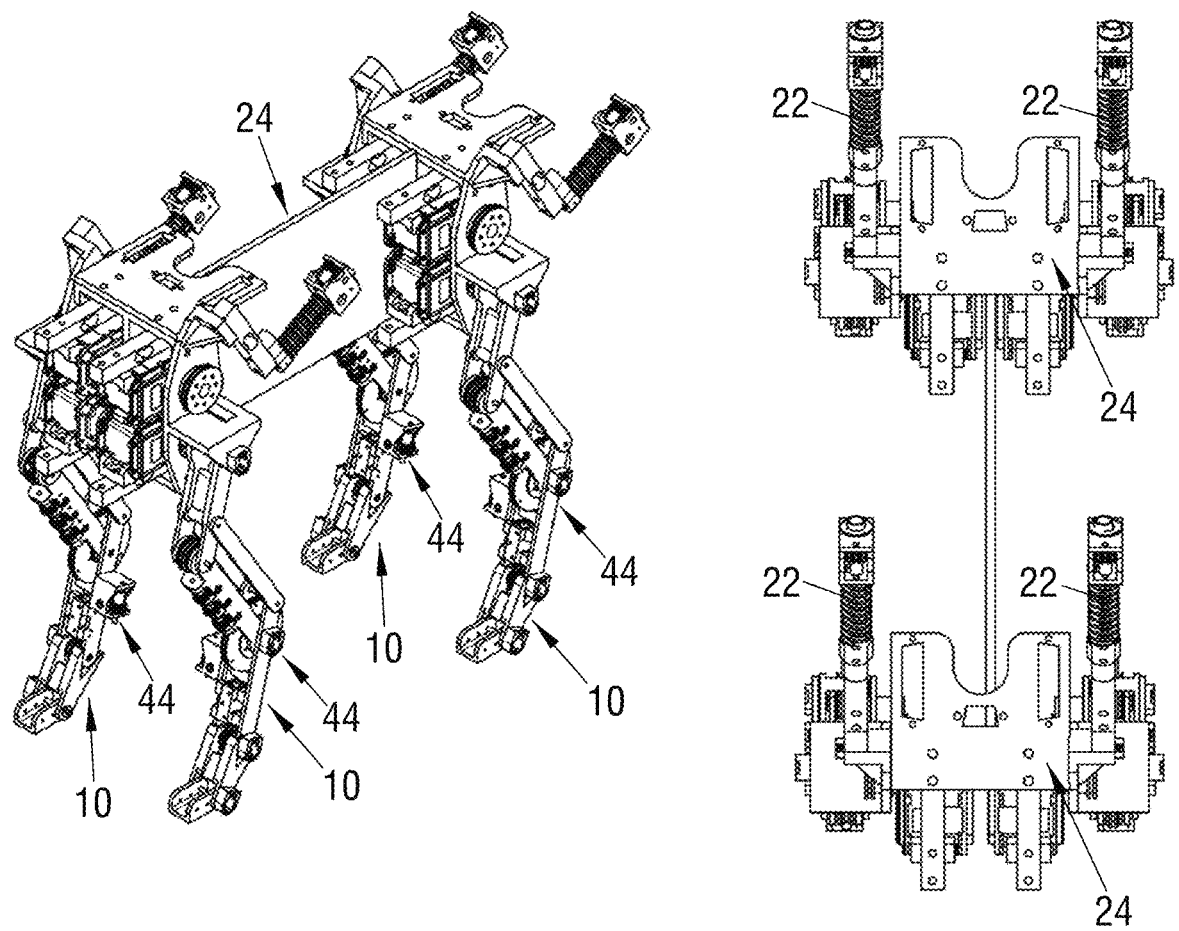

ROBOT LEG AND ROBOTIC SYSTEM

The invention relates to a robot leg. The invention further relates to a robotic system comprising at least two robot legs.

A robot leg is a mechanical leg that is able to perform functions like that of a human or animal leg. It is typically programmed to perform these similar functions and depending on the design can be controlled electrically and/or mechanically.

For years researchers have been studying to understand the underlying mechanisms of dynamic legged locomotion in animals and humans. Locomotion in animals is potentially the result of clever coupling between morphology and neural control, which results in agile, efficient and graceful animal movement.

In engineering researchers try to mimic this coupling in robot designs. Especially bipedal locomotion is regarded as a relatively complicated form of legged locomotion compared to for example quadrupedalism. In quadrupedalism a heavy horizontal trunk and a second pair of legs can utterly simplify the static stability. An example for a state of the art four-legged robot can be found CN 104 139 811 A.

To date, no one has succeeded in designing a robot leg that can actually mimic a real movement of a human or animal leg reasonably well, especially with reasonable energy efficiency and computational cost.

In view of the above it is an object of the invention to provide a robot leg, which can mimic the movement of a human or animal leg with higher energy efficiency and lower computational cost compared to the state of the art. It is a further object of the invention to provide a robotic system, which is able to control two or more of such robot legs.

According to the invention the robot leg comprises at least two joints, each joint connecting two segments one to another, with each joint comprising a cam. The robot leg further comprises at least one actuator and a common tendon interconnecting each cam.

The common tendon is thus spanned over all existing joints and is designed to capture tensile forces along with the actuator. Furthermore, the combination of actuator and tendon can be designed to capture forces in a virtual leg length, where the virtual leg basically describes the shortest distance between the first and the last segment present in the robot leg. In more detail, the virtual leg defines a virtual connection between a hip and a center of pressure of the robot leg. The actuator-tendon combination can also transfer hip torques in the first joint into the ground, or torques from the second or last joint, if more than two joints are present, i.e. a toe joint, into the robot leg.

The combination of leg segments and common tendon can carry a load, i.e. anything that might be mounted higher up than the first joint (hip) or anything that might pull the first joint down towards the floor, for example a hanging load.

The combination of actuator and tendon and leg segments can create an overall compliant leg, which reacts with leg shortening under body weight load. Hence, during locomotion, the leg can deflect in leg length direction, allowing a trunk load to passively oscillate in vertical direction, in accordance to body dynamics of legged locomotion. Moreover, the combination of actuator and tendon and leg segments can also bring about an extension of the leg following the leg shortening under body weight load.

Actuator-tendon forces can be redirected by the cams, countering the effect of the load onto the leg. Cams are mechanical linkages that are able to translate motion, such as a transformation of a rotary motion into a linear motion or to induce a pivot like movement. In the robot leg the cams can be used to redirect the movement of a joint to the movement of the common tendon, more particularly the cams can translate a rotary joint movement into a linear tendon displacement. The cams can therefore, for example, be used to redirect tendon forces into joint torques or vice versa. By connecting each of the joints to the common tendon, the movement of the segments attached to each of the joints can be synchronized leading to a more realistic mimicking of the movement of a human or animal leg with higher energy efficiency and lower computational cost compared to the state of the art. This leads to the advantage that the actuator can be formed simpler, i.e. with a reduced torque and having lower speed requirements.

According to an embodiment of the invention at least some and preferably all of the cams are linear cams. Linear cams can be cams which act in a linear behavior. Therefore, the word "linear" does not necessarily have to relate to the geometrical shape of the respective cam.

In a further embodiment of the invention a linear cam is a cam that has a center of rotation and a constant radius. The linear cam can therefore be designed as a circle or a circular segment, which rotates around its center of rotation.

According to another embodiment of the invention it is preferred if at least some and preferably all of the cams enable a movement of the two segments adjoining each joint relative to one another, preferably a pivot movement between the two segments adjoining each joint. As already mentioned earlier, cams usually can be used to transform a rotational movement into a linear movement or vice versa. Since the common tendon connects all present cams and therefore also their respective joints, a movement of one joint can result in a movement of all other joints as well. Therefore, since every two adjacent segments are connected by one common joint, these segments start to move, and preferably pivot, around their respective joint, when said joint moves. Meanwhile, the common tendon can either move together with the cam or can slide on the (circular) surface of the cam in order to produce a more compliant robot leg.

The actuator thus can serve as a kind of drive for the robot leg or for the joint (and segments) to which it is attached. The movement caused by the actuator can then be transmitted by the common tendon to any other segment that may be present, thus causing them to move, preferably pivot, about their respective cams.

In another embodiment of the invention the common tendon can be formed by two or more part tendons, wherein two directly adjacent part tendons are respectively connected to at the same one of the cams. For practical reasons it may sometimes be preferable to form the common tendon from several parts. Since two adjacent part tendons are attached to a common cam, the movement of one part tendon can easily be transferred to the other part tendon via the common cam. Thus, together they can move just like a one part common tendon.

According to another embodiment of the invention it is preferable that each part tendon is configured to produce a joint extending torque at each cam. In other words each part tendon can produce a torque at each respective cam which can straighten the two segments that are attached to the respective joint relative to each other. Just like for example a human leg which can be straightened by the movement of its knee.

According to a further embodiment of the invention said joint extending torque is configured to counteract a load exerted on the overall length of the robot leg. For example when the robot leg should be used for locomotion, there is always some kind of load present, when the leg moves to make steps. The load either can originate from some sort of trunk, a motor or even from the weight of the leg itself. Thus, the joint extending torque has to counteract the load, originating from that weight in order to extend the leg.

According to the invention at least one cam, preferably a final cam, is dimensioned such that its radius is smaller than a pre-defined threshold, with said pre-defined threshold being the equilibrium threshold for loading of the robot leg. The final cam does not necessarily have to be the most distal cam of the robot leg, but it can rather be the last cam which connects one leg segment which is lying flat on the ground with one segment that is still involved in the leg movement at a certain point of the leg movement, especially during the stance phase of the robot leg. Thus, the final cam defines the last cam which connects a leg segment which is still involved in the leg movement with one that is already flat on the ground. There also could be more than one cam which can be defined as "the final cam" at different times of the leg movement.

By having several such under dimensioned cams, one can mimic the function of the metatarsels in a foot. Metatarsels produce a stabilizing motion during a standing phase of the leg. By under-dimensioning the cams they will produce insufficient torque to erect the leg. Instead they crouch faster compared to their connected balanced joints, which typically makes them touch the floor and permits at least some of the segments connected thereto to also align relative to the floor providing the robot leg with the desired stability. This event changes their function and they become part of the flat floor.

In the robot leg said final cam can be dimensioned such that its radius is smaller than its pre-defined threshold value, causing the respective joint to collapse at a certain point (angle) of the leg movement in order to self-disengage the tendon and to start the flexing mechanism of the robot leg. This has proven to be a massive advantage over the common known robot legs which use motors to disengage the joints and start the swing phase, since this approach is energy and power costly.

According to the invention the equilibrium threshold is defined as $F_c * r_c \propto F*d$, preferably as $F_c*r_c=F*d$, wherein F defines an overall force which acts on the robot leg, d defines the distance from the cam to the virtual leg, $F_c$ defines a (tendon) force which acts on the respective cam and $r_c$ defines a radius of the respective cam. In equilibrium the equation has to hold, meaning that the radius of the present cam have to be chosen appropriately. F typically acts in the virtual leg length direction. The equilibrium threshold equation can also be split into two separate equations, which are defined as $F_c*r_c=t_c$ and $F*d=t_c$, where tc is a torque induced in the respective joint. In a balanced joint this torque is equal to the product of (load) force and joint distance to the virtual leg axis, which then leads back to the above defined equilibrium threshold equation.

In view of the foregoing it is the clear that an under-dimensioned cam may thus be equated to an unbalanced joint and hence this type of joint does not satisfy $F_c*r_c \propto F*d$ or $F_c*r_c=F*d$, but rather satisfies the following equation:

$$F_c*r_c \neq F*d.$$

In the above mentioned case, the radius of the final cam or cams can purposely be chosen such that it is smaller than the radius which holds the equilibrium state.

According to another embodiment of the invention it is preferred if at least one of the actuators is configured to bring about at least one of a movement and a force. Active actuators, such as motors of different kinds, are mostly configured to bring about a movement of a robot leg or to bring about a movement of at least one joint of the robot leg. The connection via the common tendon can then cause the rest of the leg to move as well.

Other actuators, such as springs for example, can be considered as passive actuators which can bring about a force, for example a spring force, onto the robot leg. Such a force can in the end result in a movement of the robot leg as well. Also it could be possible that such actuators are configured to store energy which is produced by the leg movement itself.

It is preferred if at least two actuators are provided, a first actuator comprising a spring and a second actuator comprising a motor. Thus, the robot leg can comprise both an active and a passive actuator in order to cause a movement as well as a induce force at the robot leg. Furthermore, each actuator could also comprise a gearbox.

According to an embodiment of the invention it is preferred if at least one of the actuators is a spring, in particular one of a linear spring, a non-linear spring, an extension spring, an air spring, a metal spring, a coil spring, a leaf spring, and a compliant mechanism, and/or wherein at least one of the actuators is a motor, in particular one of a combination of a motor with a gearbox, a linear motor, a non-linear motor, an electric motor, preferably a brushed rc-actuator, a fluidic actuator, such as a pneumatic actuator, and a stepper motor. The spring as well as the motor can be chosen as needed. The motor can also be chosen to be an electro-magnetic motor, a hydraulic motor, a magnetic motor, a mechanical motor or a motor in the form of biological muscles. Other examples may be brushless motors, motors based on shape memory alloy actuation, electro-static actuators or soft actuators. It is also conceivable that the actuator could be implemented by the muscles of a human being.

In the case where more than one actuator is present in the robot leg, a selection of the type of each actuator can be made, i.e. whether the actuators are all of the same kind or if they differ from one another.

In embodiment of the invention between two and eight joints are provided, wherein said joints are preferably arranged in series. It is also possible that some of the joints are arranged in parallel to each other in order to enhance for example the strength of some segments by providing a second, parallel segment, or in order to provide an extra actuator for a special segment. In the case of parallel segments, this allows for example the resulting leg to withstand torques applied at the hip joint. There are no limitations in the actual design of the robot leg.

An arrangement of joints in series on the other hand can provide a leg, which can be moved through all of its length via the one common tendon by simply moving one end of the tendon or applying a force to one end of the tendon which induces a movement along the complete length of the robot leg to bring about a reduction in the leg length or an extension of the leg length from a reduced leg length. Since the tendon connects all joints together, a serial arrangement leads to a transfer of movement from one joint to the next one in line.

According to another embodiment of the invention it is preferred that if three or more joints are provided, a further actuator is provided that is arranged between two directly adjacent joints adjacent to the segment interconnecting said two directly adjacent joints. As already mentioned earlier, an additional actuator can be provided. The actuator can either be a passive actuator, such as a spring, or an active actuator such as a motor. The actual design of the actuator can be chosen as needed. For example, when a spring is chosen for the additional actuator, it can absorb torques originating from a movement or a torque of a possibly existing trunk, which obviously moves during locomotion.

In a further embodiment of the invention the further actuator is configured to store an energy made available by the torque acting on said directly adjacent joints and to bring about a displacement between said directly adjacent joints. In real life ap-plications usually a trunk is given which is connected to the robot leg according to the invention. The trunk can for example comprise some kind of body, such as a human or animal upper body, or can also comprise a motor or anything the like to provide the robot leg with energy. All of the above produce some kind of torque on at least one of the joints of the robot leg, when the leg is walking or running. Therefore, the further actuator is configured to store that energy which is made available by said torque in order to use it in the further motion sequence of the robot leg. Thus, the energy to be supplied to the leg from the outside can be reduced. Also, perturbations can be mitigated into spring deflections.

According to another embodiment of the invention it is preferred that the robot leg further comprises a further tendon, interconnecting the final cam with a last segment and the final cam having a radius at the pre-defined threshold of the series of cams. The final cam can either be understood as a cam which has to align a foot to the ground between the swing and the stance phase of the leg, to let the foot touch ground properly during the transition from the swing phase to the stance phase of the leg, or it can be understood as that cam which is pushed towards a snap-through angle during the stance phase of the leg. The snap through angle is reached when the respective neighboring segments of said cam are oriented coaligned. Once this snap-through angle is reached and crossed, the further tendon is unloaded and the leg collapses, i. e. reaches the point of transition between stance and swing phase.

Either way, at least the at least one final cam can have a radius which is smaller than the above mentioned equilibrium radius for said cam, in order to make sure that at least one of the above mentioned collapsing-mechanisms takes place in said cam. Depending on which phase of locomotion of the robot leg is analysed, it is also possible that more than one cam can be defined as "final cams" with corresponding radii. At different times during the locomotion different cams can be defined as "the" final cam.

During the stance phase, the final cam needs to collapse in order to unload the further tendon and to move the leg out of its equilibrium state and to allow the leg to introduce its swing phase without requiring much energy from a motor or the like which would have to move the respective segments actively.

During the swing phase of the leg, the further tendon can also ensure that said (maybe other) final cam aligns the "toe", i.e. the last segment, (horizontally) to the ground in order to prepare the leg for touching the ground and initiating its stance or standing phase. The further tendon does not necessarily have to be one single tendon but can also be assembled from a plurality of further tendons. The final cam again does not necessarily have to be the last cam in line. It could also be possible that more than one cam has to align its segments to the ground one after the other.

According to a further design of the robot leg this further comprises a control and evaluation unit and optionally at least one sensor, with the control and evaluation unit being configured to control and actuate at least one of said actuators, optionally in dependence on parameters measured with said at least one sensor. In this way the locomotion of the robot leg can be controlled in a pre-defined manner and optionally also regulated due to the parameters detected using the sensors. The sensors could be force sensors, pressure sensors, acceleration sensors, gyroscopic sensors, proximity sensors, in particular sensors sensing distance to contact or height of center of mass, torque sensors, displacement sensors, in particular linear or angular displacement sensors, or velocity sensors.

The invention further relates to a robotic system with at least two robot legs according to the invention, a control and evaluation unit, wherein the control and evaluation unit is configured to synchronize the robot legs in such a way, that a common locomotion of the robot legs is brought about. When two or more robot legs are present control and evaluation units are required which synchronize the legs in such a way, that they work together in order to enable a common, for example bipedal, locomotion.

Figure 2:
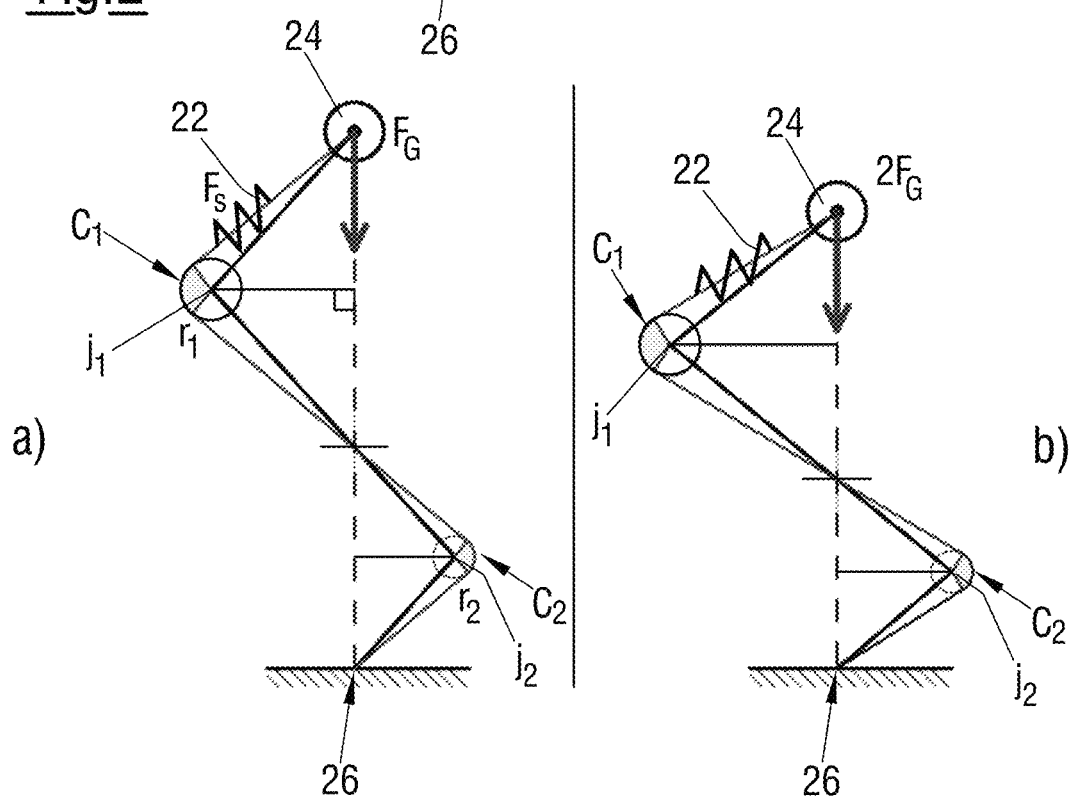
Figure 4:
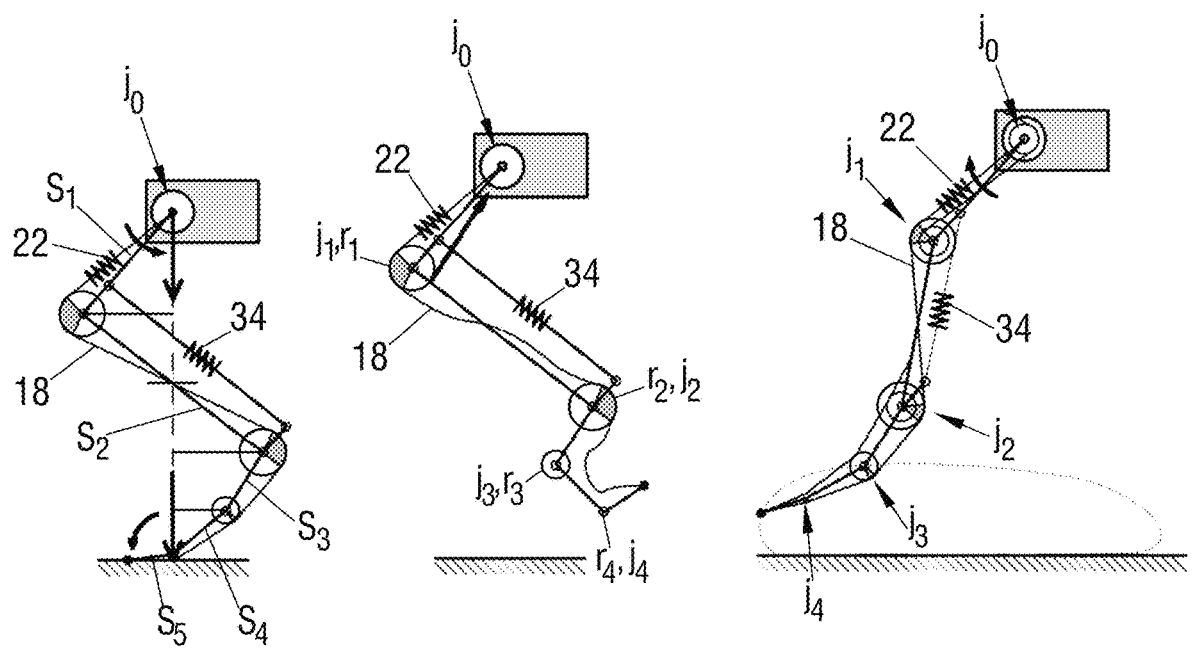
Figure 5:
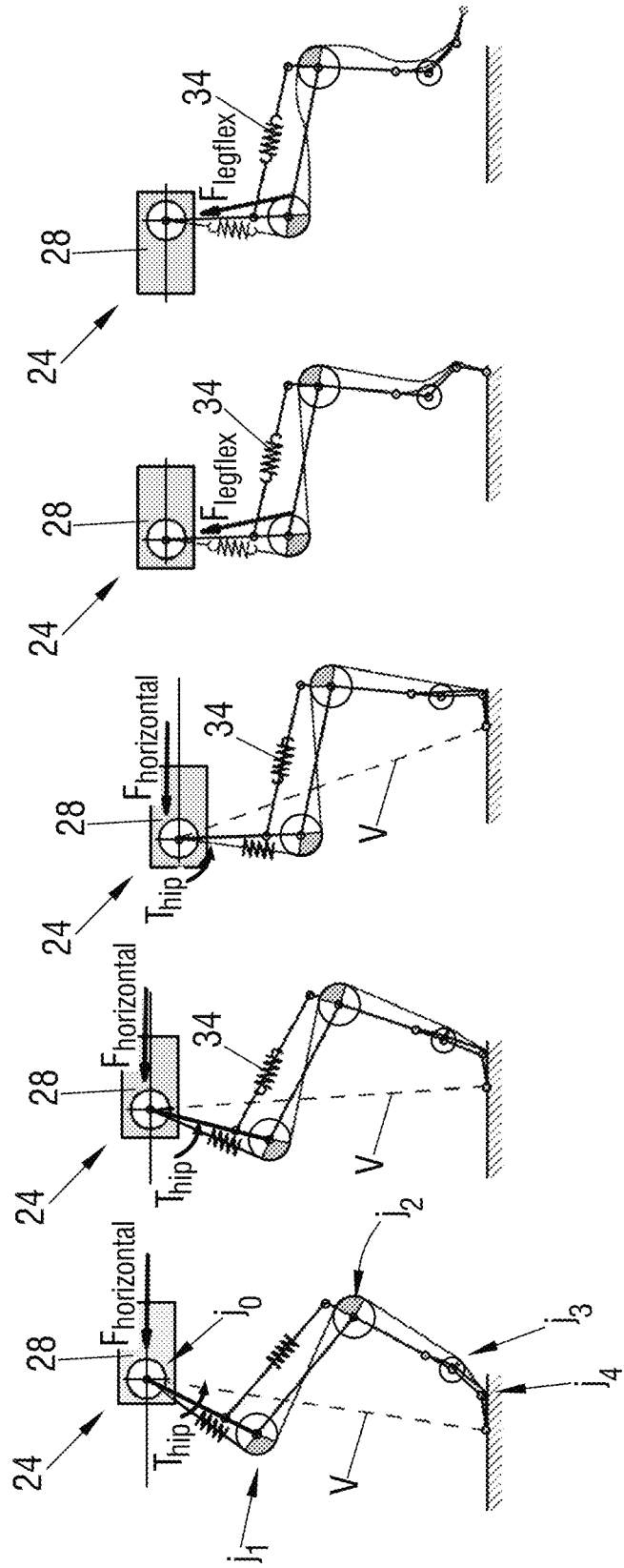
Figure 6:
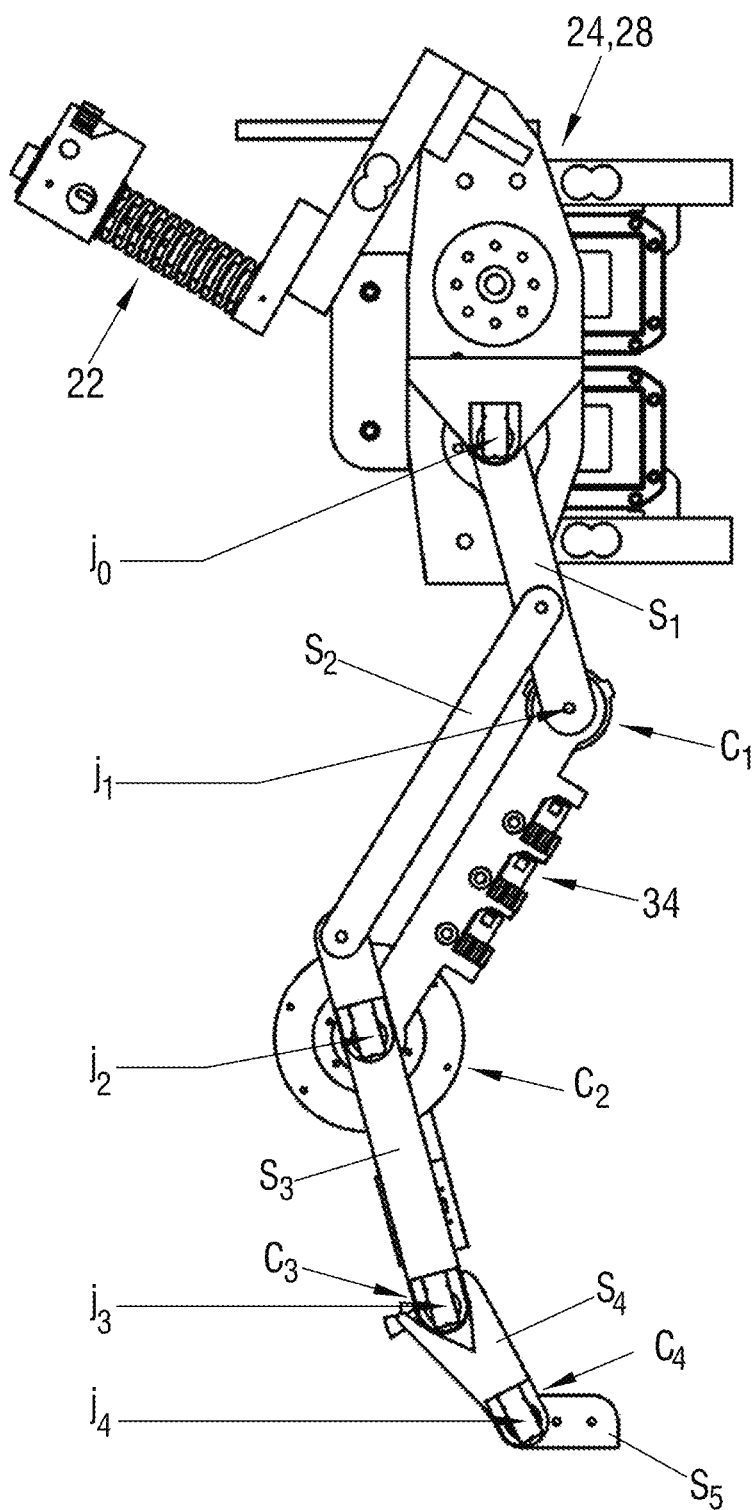
Figure 7:
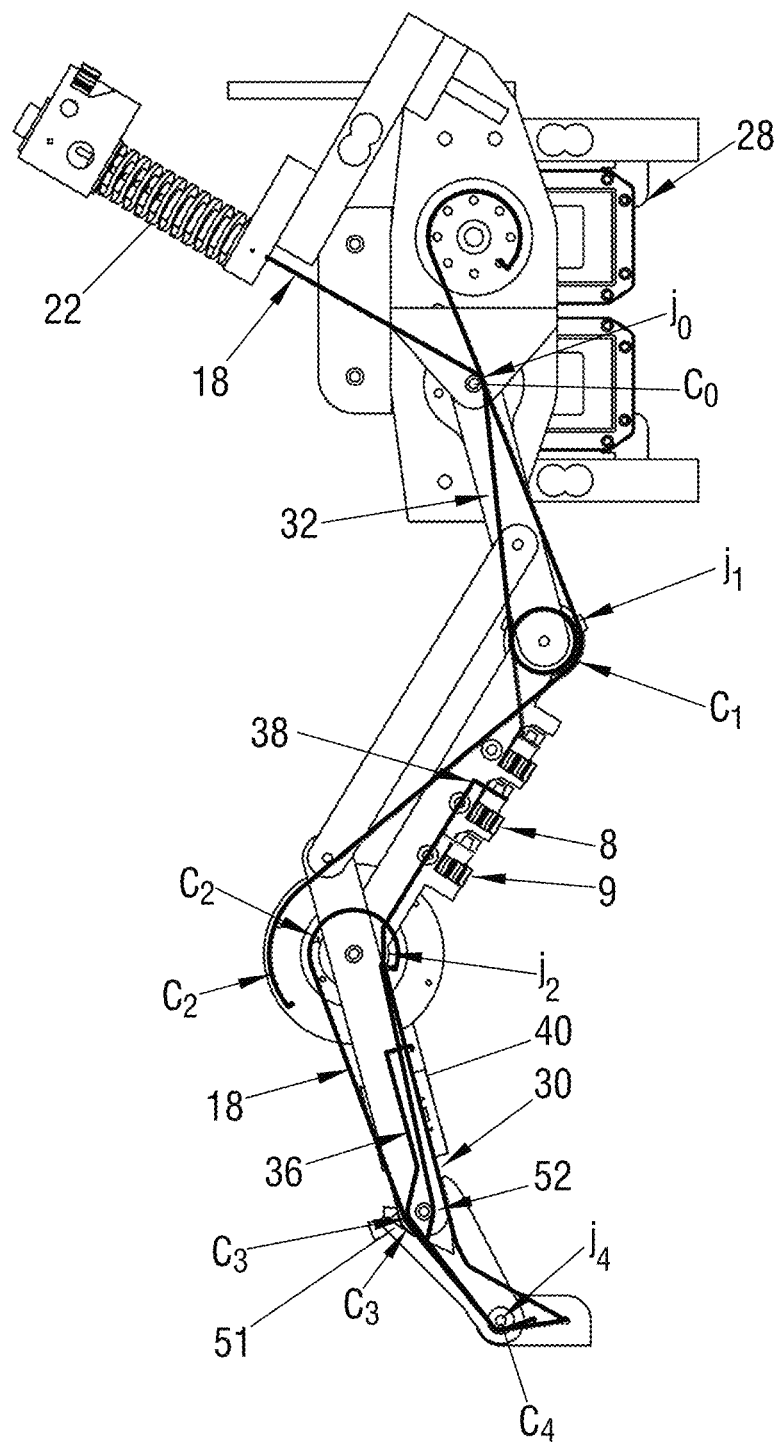
Figure 8:
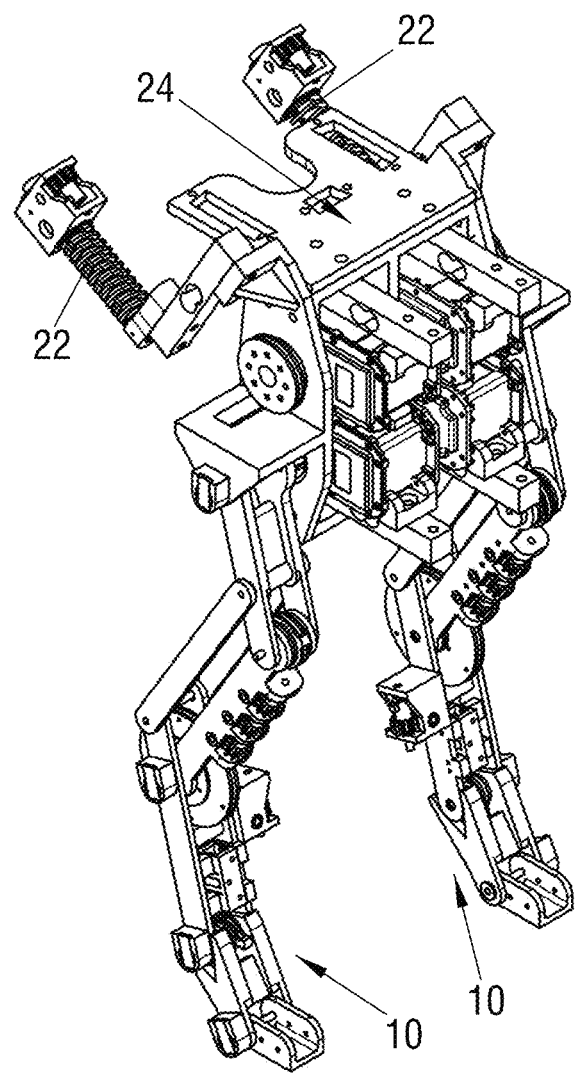
Figure 9:
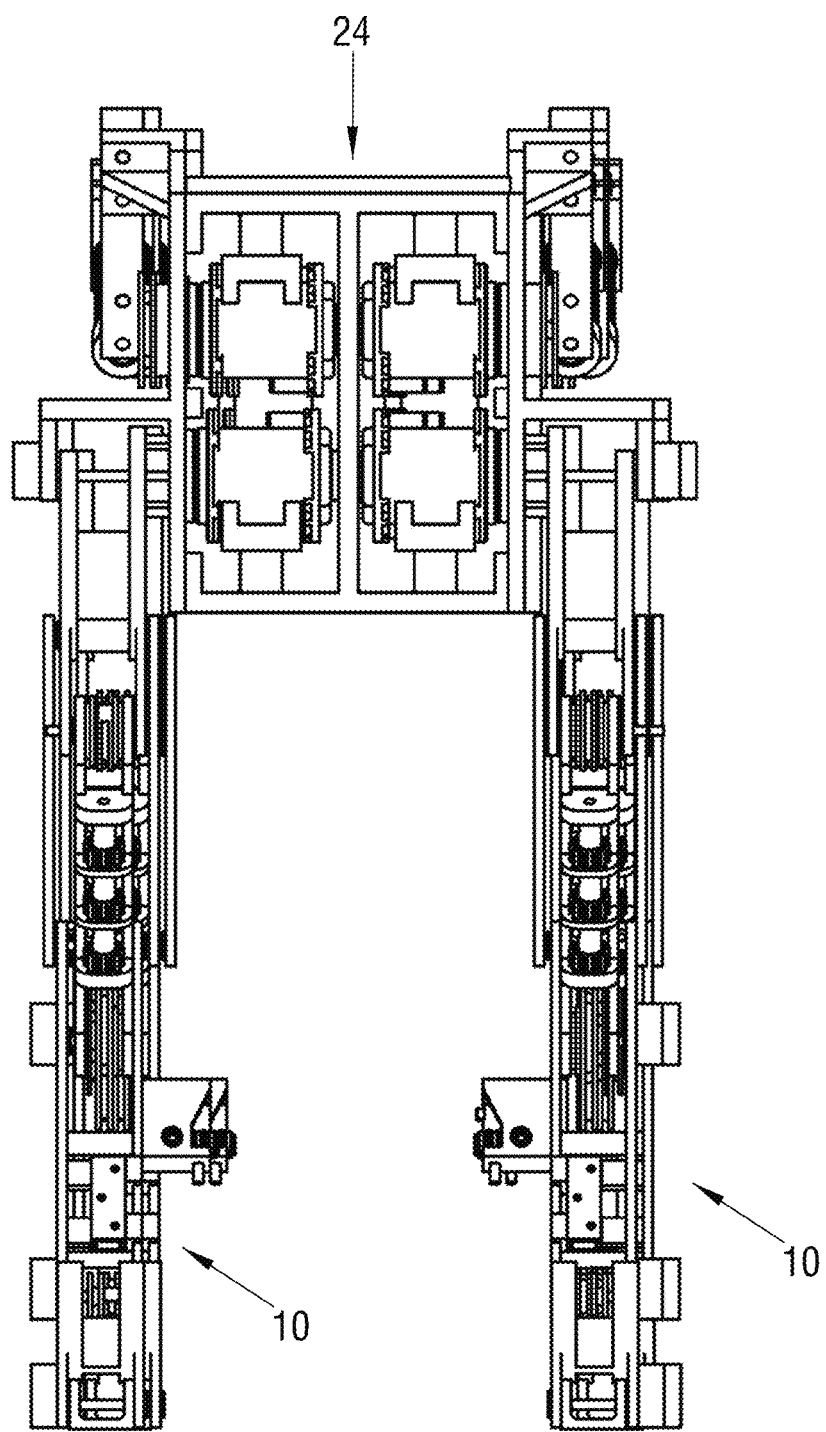
Figure 10:
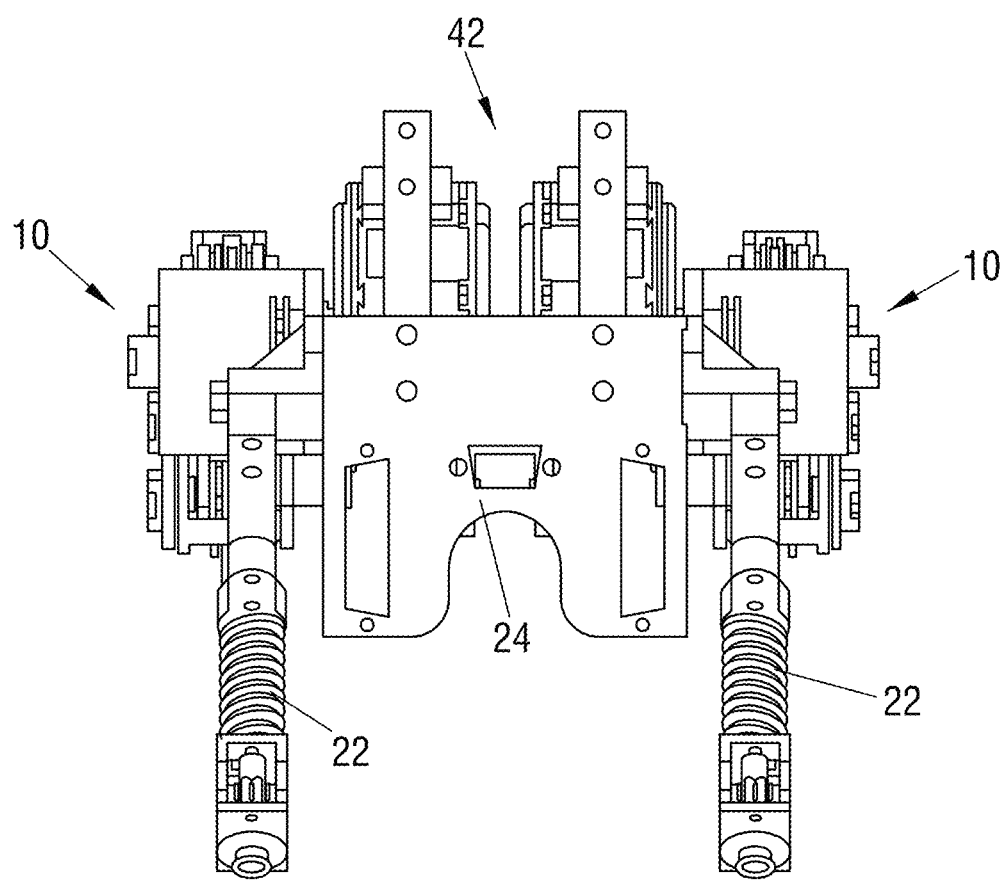
Figure 11:
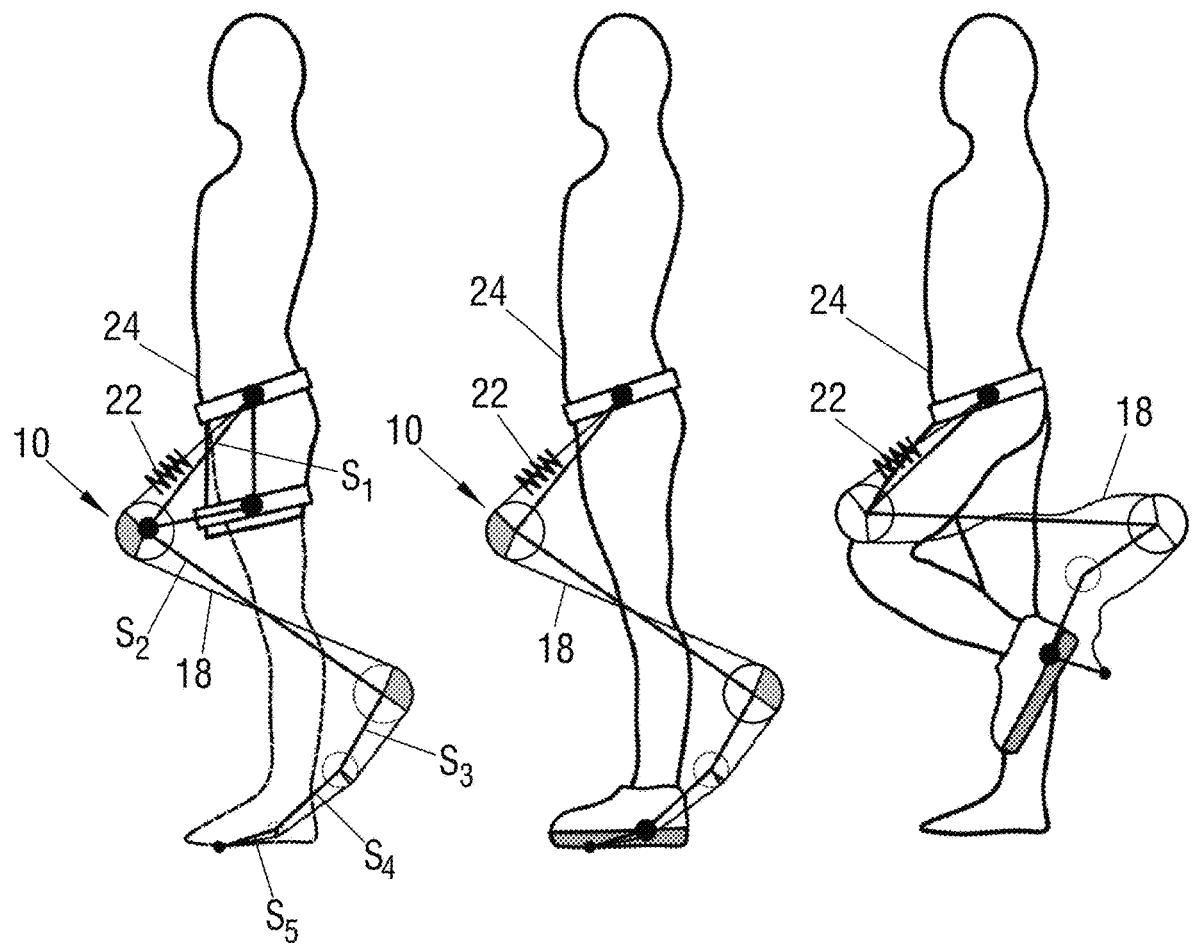
Figure 13:
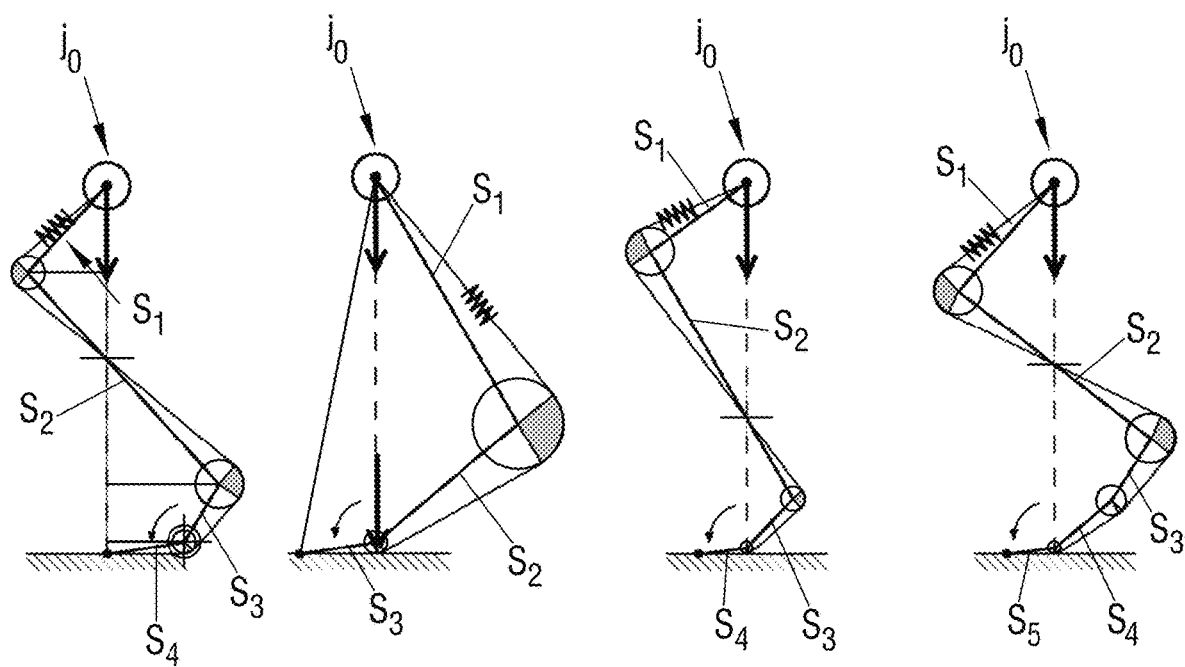

Further embodiments of the invention are described in the following description of the Figures. The invention will be explained in the following in detail by means of embodiments and with reference to the drawings in which is shown:

FIG. 1a: an example of a robot leg;

FIG. 1b: examples of how the radius of a cam from FIG. 1 changes with the lengths of the segments;

FIGS. 2a and b: an example of a further robot leg at different times during the movement;

FIGS. 3a and b: an example of a further robot leg;

FIG. 4: an example of a further robot leg at different times during the swing phase and the stance phase;

FIG. 5: an example of a further robot leg at different times during the swing and stance phases;

FIG. 6 a side view of an exemplary embodiment of a robot leg;

FIG. 7: a cross-section of the robot leg of FIG. 6 indicating the common tendon;

FIG. 8: a perspective view of an exemplary embodiment of a robotic system with two robot legs;

FIG. 9: a front view of the robotic system from FIG. 8;

FIG. 10: a top-view of the robotic system from FIG. 8;

FIG. 11: an exemplary application of a robot leg;

FIG. 12a: different views of an exemplary embodiment of a robotic system with four robot legs;

FIG. 12b: different views of a further exemplary embodiment of a robotic system with four robot legs, and FIG. 13: different examples for more-segment leg structures.

In the following the same reference numerals will be used for parts having the same or equivalent function. Any statements made having regard to the direction of a component are made relative to the position shown in the drawing and can naturally vary in the actual position of application.

FIG. 1 shows the most basic model of a robot leg 10. The robot leg 10 comprises two joints $j_0$, $j_1$, each comprising one cam $c_0$ and $c_1$, respectively. Joint $j_0$ describes the "hip" of the robot leg 10. Joint $j_0$ is typically connected to a further segment which is not illustrated, but which may e.g. be a torso or a trunk 24 (see e.g. FIG. 12).

The further joint $j_1$ moveably connects two segments $s_1$, $s_2$ which are directly coupled via the cam $c_1$ at the common joint $j_1$. Furthermore, the robot leg 10 comprises a common tendon 18, which connects both segments $s_1$, $s_2$ via the cam $c_1$ with each other, as well as one actuator 20, which is arranged near the first segment $s_1$ and which comprises a spring 22. The spring 22 is designed such that it can apply a force $F_S$ to the common tendon 18 in order to extend or straighten the robot leg 10. A trunk load 24 is added to the robot leg 10 in order to mimic for example a normal body weight. The trunk load 24 also includes the weight of a second actuator 20 which comprises a motor 28 that induces a movement in the robot leg 10. The trunk load 24, contrary to the spring 22, pushes and hence flexes the robot leg.

In this connection it should be noted that the hip joint $j_0$ may be designed as a zero size cam, i.e. the hip joint does not necessarily comprise the same features as the other joints of the leg which then actively participate in the movement of the robot leg 10. For reasons of mechanical simplicity the spring 22 may be attached at the trunk 24, so that the resultant torque in the hip joint is minimal, this typically means that it has less than 5% influence on the overall torque.

FIG. 1a also shows the definition of a virtual leg V, which is basically the shortest distance between the highest point of the robot leg 10, i. e. the hip $j_0$, and the low-est point of the robot leg 10, i.e. the toe, which touches the ground, which is usually also the center of pressure 26. When there are more than two segments present in the robot leg 10, the center of pressure 26 can also be located somewhere along the last segment of the robot leg, since it can be possible that said last segment lays flat on the ground during the stance phase of the robot leg 10.

FIG. 1b shows the dependence of the radius of cam $c_1$ on its position in the robot leg 10. What FIG. 1b basically shows is that the longer the perpendicular distance between the cam joint to the virtual leg is, the bigger the radius r of cam $c_1$ has to be in order to keep the leg in a pre-defined equilibrium state, i. e. during the stance phase. The same holds true for all radii $r_i$ of all cams $c_i$ that might be included in the robot leg 10 (see also FIGS. 2a and b).

As already explained the radius $r_i$ of one or more cams $c_i$ can also purposely be chosen to be smaller than the pre-defined threshold value in order to either introduce a collapse of the respective joint $j_i$ which introduces the swing phase of the robot leg 10 automatically without further external power supply or which fixes the leg, i.e. holds the weight, during its stance phase, i.e. which aligns the toe in order to touch the ground properly.

The spring 22—tendon 18—combination is designed to counter forces in virtual leg V length. It also transfers hip torques applied from the motor 28 in the first joint $j_1$, or torques from the toe joint, i. e. the last segment, into the leg 10.

The combination of spring 22, tendon 18 and leg segments $s_i$ creates an overall compliant leg, which reacts with leg shortening under body weight load 24.

FIGS. 2a and b also show the behavior of the robot leg 10 under different trunk loads 24. Comparing the two figures one can easily recognize that the robot leg 10 acts like a spring under different trunk loads 24 in the direction of the virtual leg V. Hence, during locomotion, the leg deflects in leg length direction, allowing the trunk load 24 to passively oscillate in vertical direction, in accordance to body dynamics of legged locomotion.

In the following, an exemplary embodiment of the robot leg 10 and how its different components work together during locomotion of the leg is described with the help of FIGS. 3 to 7. An overall view of the different components of the embodiment described is shown in FIGS. 6 and 7. For the movement of the exemplary robot leg 10 reference is made to FIGS. 3 to 5.

FIGS. 3a and b show an example of a robot leg 10 which comprises five joints $j_0$, $j_1$, $j_2$, $j_3$, $j_4$ with five cams $c_0$ to $c_4$, respectively, a common tendon 18 and one spring 22. Furthermore the robot leg 10 can comprise a further spring 34 which is arranged parallel to the second segment $s_2$ and which can absorb torques originating from the trunk load 24 (see esp. FIG. 4). The spring 34 can usually also store the energy which comes from said torque and use it for the further movement of the leg 10.

The robot leg 10 is shown in its stance phase, with its last segment $s_5$, which is coupled to the final cam $c_4$, touching the ground. One can see in FIG. 3a that already under normal trunk loads 24, such as for example a normal body weight, torques in the last joint $j_4$ induce forces at the end of the last segment $s_5$. Forces along the virtual leg V are directed through that last joint $s_4$ into the ground. Therefore, a center of pressure 26 can be defined (FIG. 3b) which can be manipu-lated via the combination of spring 22 and common tendon 18, that can alter the torque in the last joint $j_4$. A shifting center of pressure 26 is an essential feature in legged locomotion of leg mechanisms with area contact and torque in the related joint j.

The swing phase of the exemplary robot leg 10 is shown from left to right in FIG. 4. The spring 22 is designed to be slack during the swing phase (see the left and middle drawing) and self-engaged and active in the stance phase (see the right hand drawing). A spring engagement is self-driven, through a set of foot and toe extending tendons 18, 30, acting on the foot and toe joint $j_3$, $j_4$. The toe segment $s_5$ provides the moment arm and its cam surface for the tendon 18 carrying the load 24.

The right side of FIG. 4 shows that the toe segment $s_5$ stays flat on the ground in the stance phase of the leg 10. This is achieved by setting its cam radius $r_4$ to a specific value, which is smaller than the pre-defined threshold value.

This means that the final cam $c_4$ of the joint $j_4$ is a so-called under-dimensioned cam which does not satisfy $F_c * r_c = F * d$, but rather satisfies the condition $F_c * r_c \ddagger F * d$ in such a way that the distal segment $s_5$ associated with the joint having the final cam $c_4$ can collapse and align essentially in parallel with the floor (see the drawing on the left of FIG. 4), whereas the other segment $s_4$ associated with the joint $j_4$ is inclined relative to the floor due to the tension present within the robot leg 10 brought about by the common tendon 18.

A slack common tendon 18 and spring 22 allows flexing the robot leg 10 during swing phase, without working against a leg-extending spring. This is a significant improvement to the earlier robot-designs, and one of the main reasons for the here disclosed design changes. With a slack leg 10, already a small and low-power leg flexing actuator 20 (see motor 28 in FIGS. 5 to 7) is able to flex the leg 10. This pro-duces the required toe clearance for the swing phase (left side of FIG. 4).

While most of the leg segments $s_1$, $s_2$, $s_3$ are folded up, the foot and toe segments $s_4$ and $s_5$ are curled up. The curling motion is transmitted by the common tendon 18, while the spring 22 is slightly loaded by the leg's 10 weight. The curled-up and the extended position of the foot joint ja is usually limited by mechanical joint limits 51, 52 (see FIG. 7), the movement of the toe segment $s_5$ on the other hand is usually only limited by the standard movement range of its joint $j_4$.

At the end of the stance phase, a fast running self-propelled spring 22—tendon 18 disengagement can potentially be achieved by trunk dynamics. However, during walking and slow running trunk loading 24 and leg loading dynamics are not necessarily in phase. Hence, trunk dynamics would contribute insufficiently to the leg disengagement.

Alternatively, the leg could be forced to flex. However, actively flexing a loaded leg 10 by a flexor tendon 32 (see FIG. 7) and the motor 28 has shown to be difficult. When applying force via the tendon 32 into the cam $c_1$, leg joints $j_3$, $j_4$ react to the knee $j_1$ flexion by angular extension. As a result the leg stays on the ground. Instead, all coupled joints $j_i$ are just slightly rotated. While it is possible to disengage the loaded global spring 22—tendon 18 by high forces, this naive leg flexion approach is energy and power costly. Because motor power couples forces and ve-locities, a high required force also limits the speed of disengagement and potentially delays the onset of the swing phase.

This is why the self-disengaging mechanism for the common spring 22—tendon 18 is designed. At its core are the additional joint $j_3$ and a distal disengagement tendon 36. The leg 10 in stance, with the toe $s_5$ on the ground redirects the hip joint $j_0$ torque produced by the hip motor 28 and hip joint $j_0$ angular movement into the ankle joint $j_4$ displacement and torque. The only distally acting disengagement tendon 36 couples this ankle joint $j_4$ movement into the foot joint $j_3$ movement and collapses the joint $j_3$. It is noted that in the shown embodiment $j_3$ comprises two different cam radii for different tendons, one for the common tendon 18 (typically the larger one) and one for the disengagement tendon 36 (typically the smaller one).

This effectively integrates and transfers parts of the hip torque (of motor 28 or of forces acting on the system which push the hip forward) and its angular movement into power in the distal foot $j_3$ and ankle $j_4$ joint. The requirement for the disengagement mechanism to work is the distal segment $s_5$ to be flat on the ground.

The power transfer eventually buckles the foot joint $j_3$ (see FIG. 5), forced by the distal disengagement tendon 36. The tendon length and force can be adjustable by an adjustment mechanism 40. The point of the disengagement becomes a function of the leg angle, the adjusted tendon length and the leg loading. Following the common spring 22—tendon 18 disengagement the leg flexing tendon 32 can now easily lift up the leg during the swing phase. The folding of the leg segments $s_i$ is coordinated by the common tendon 18 and the spring 22.

The toe segment $s_5$ staying flat on the ground during the stance phase is a requirement for the above disengagement mechanism to work and an integral part of the disengagement mechanism to function.

Figure 3:
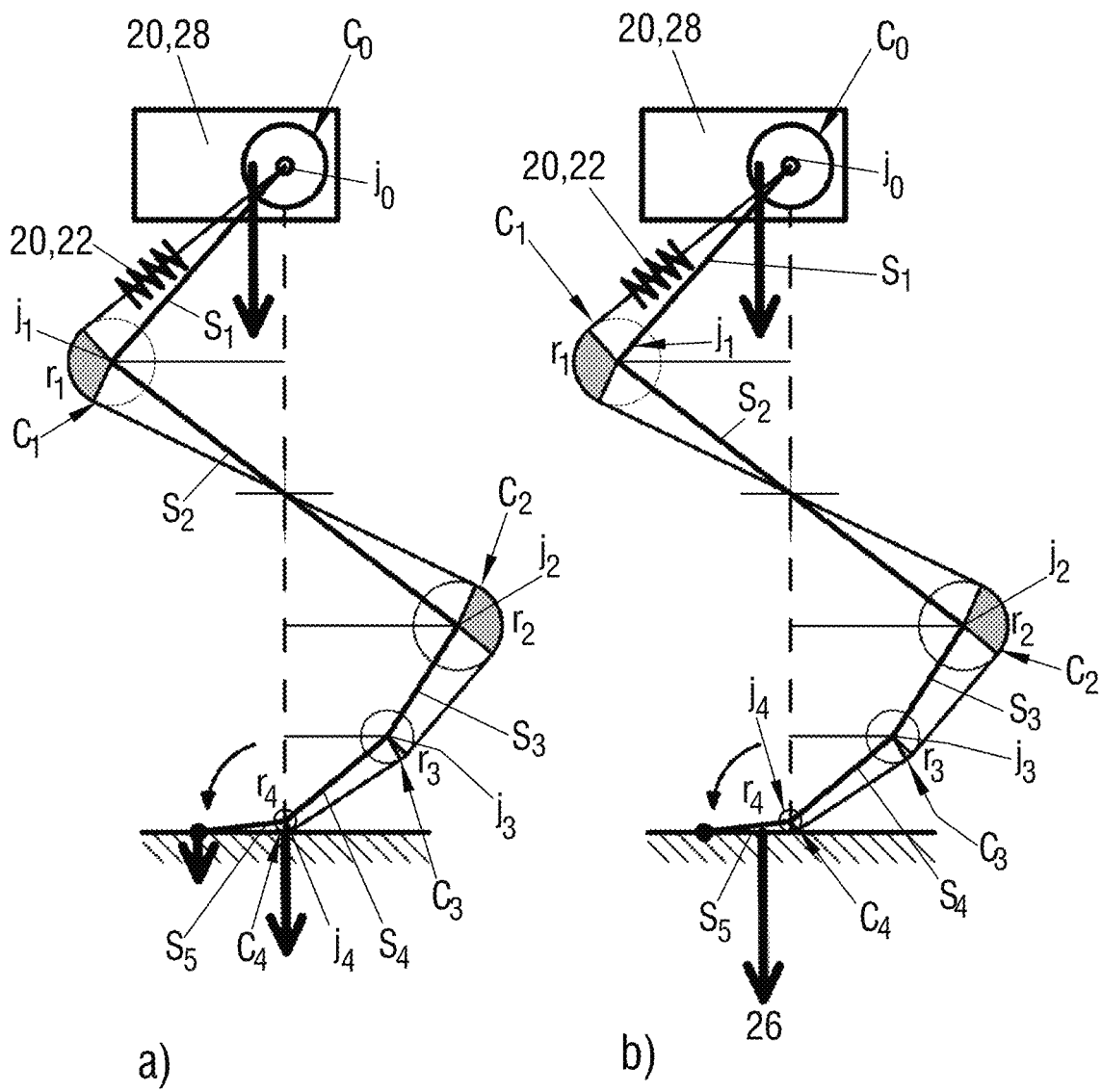

During the stance phase, the ankle creates a multi-point contact with the ground (see also FIG. 3). Internally, the joint carries torques, through loading of several tendons around its cam $c_4$ radius. The multi-point contact toe allows shifting the robot's center of pressure 26 over the range of the toe $s_5$ length. The center of pressure 26 position is then a function of the leg loading (between $j_0$ and $j_4$) and joint torque in joint $j_4$ (see FIG. 3). The latter is a function of (flexor) tendon forces (lower part of tendon 18 and 36) and cam radius r of the respective cam c.

The next section discloses the functionality of the exemplary embodiment of the robot leg 10 and its motion sequence during locomotion. As a special feature of the real-life application of the robot leg 10 which is shown in FIGS. 6 to 12, the spring 22 is attached distant from the first segment $s_1$ of the robot leg 10. This has nothing to do with the functionality of the spring 22 but is rather caused by a lack of space. Theoretically the spring 22 could also be placed adjacent to one of the segments s, just like it was shown in the previous Figures.

A global spring-tendon, which is the combination of spring 22 and common tendon 18, and its peripheral hardware is designed and dimensioned to extend a multi-segmented leg against gravitational and dynamic loads in virtual leg V length direction (FIG. 4). Extra elements to incorporate the effect of torques acting on the leg system were added. The framework allows to design two-segment, three-segment and more-segment leg structures, all tensioned in leg length direction by a global spring-tendon 22, 18. Different examples for more-segment leg structures with and also without disengagement mechanisms can be found in FIG. 13, the ex-planation of the function of these leg structures is to be found in connection with the previous Figures.

The global spring-tendon 22, 18 mechanically couples deflection and loading of all involved leg joints $j_1$, $j_2$, $j_3$, $j_4$. As a result, the multi-segmented leg acts like a single, coherent, mechanical spring during stance phase (FIG. 4).

The leg loading is not only and always along the virtual leg V but can also incorporate torques originating from the hip joint $j_0$ or the toe joint $j_4$. Torques are captured in the leg structure with a spring-loaded four-bar structure, or a fixed bar structure (34, FIG. 5 with a spring version of it). The four bar structure is provided in addition to the global spring-tendon 22, 18 guiding the leg structure. It limits the relative movement between the segments $s_1$ and $s_3$, either by a spring, a tendon or a spring tendon.

Within the above framework, a mechanism to engage the global spring-tendon at the transition from swing to stance phase has been designed. The global spring-tendon engagement is also designed to keep the distal leg segment flat on the ground for most parts of the stance phase. For this the toe joint $j_4$ radius $r_4$ is dimensioned accordingly. Engagement is kept by means of the most distal leg segment $s_5$. This mechanism presents a self-engaging clutch for the global spring-tendon 22, 18. Self-engaging clutch mechanisms have partially been hypothesized before for two segment leg structures. Here it is applied to a five-segment leg structure.

All leg joint cams $c_0$ to $c_4$, where $c_1$, $c_2$ and $c_3$ are multi-part cams, are designed with fixed radii. This allows relatively easy calculation of the mechanical coupling of its involved tendons. Fixed cam radii r also allow a designing of a large range of leg length deflection during stance phase and a large range of leg flexion during swing phase.

In this connection it should be noted that more complex behaviors of the robot leg can be envisaged. Such complex behavior can be brought about by providing non-linear cam radii, i.e. cams that do not rotate about an axis, but rather about two axes such as is produced by an oval shaped cam.

In this connection it should be noted that more complex leg behaviors could be i.e. a nonlinear leg stiffness, meaning that by constantly changing leg length, forces in leg length direction would change in a non-linear fashion.

The spring-tendon engagement starts at the touchdown and continuous during the stance phase. A novel, mechanical disengagement mechanism which forces the global spring-tendon to disengage at a certain angle is designed. Successful disengagement effectively starts the swing phase.

The timing of the disengagement is mechanically adjustable by setting the length of the disengagement tendon 36 through its adjustment mechanism 40. In a spring-mass system, spring relaxation would normally depend on spring-mass dynamics only. Because body mass and body dynamics continuously load the leg's spring 22, spring disengagement (early disengagement) other by full return through its slack length would not be possible. This is especially the case at lower speed, during walking gaits and gaits which transit between walking and running.

A workaround in the form of an additional, distal disengagement tendon mechanism is designed. The distal disengagement tendon 36 forces the loaded global spring-tendon 22, 18 leg to collapse. Collapse happens in an additional leg joint $j_3$, which was introduced solely for this purpose. Angular increase in the joint $j_4$ re-duces the available arc length in the joint $j_3$, coupled by the disengagement tendon 36. Because of its fixed length, tendon 36 starts collapsing joint $j_3$. An increase in the angle of joint $j_4$ leads to a decrease in the joint angle of joint $j_3$. The collapse happens when the joint $j_3$ angle reaches 180 degrees, where it eventually snaps or buckles through. Form this point on the chain of forces produced by the global spring-tendon 22, 18 along the segments s is not maintained anymore and the leg 10 is unloaded. Spring energy stored at the point of disengagement pushes the nearby leg segments $s_3$, $s_4$, $s_5$ forward at the onset of the swing phase. In es-sence, the combination of a loaded, springy leg 10 and the disengagement mechanisms presents a "catapult" acting on the lower leg segments s at the transition from the stance to the swing phase.

Making use of a mechanical, passive spring (global spring-tendon) can be very energy efficient and efficient in terms of control. Without actuation no control and also no sensing mechanisms are required in stance phase. Engagement and disengagement of the global spring-tendon 22, 18 are designed to act without sensing. Instead, the robot leg 10 can walk and run in feedforward control.

In stance phase and already under normal loads 24 (for example normal body weight), the foot touches the substrate over an area, inducing multipoint forces with the ground. Specifically, torques in the toe hinge joint j4 induce forces in the toe's tip $s_5$ (FIG. 3). Forces along the virtual leg V are directed through the foot's hinge joint into the ground. Global spring-tendon 22, 18 forces are a function of robot load (body weight and body dynamics), leg angle and toe angle. The combination of two abstracted reaction force vectors in the toe segment $s_5$ creates the robot's center of pressure 26. Because the global spring-tendon 22, 18 mechanism alters torques in joint $j_4$, it indirectly allows manipulating the robot's center of pressure 26 in fore-aft direction. A shifting center of pressure 26 is an essential feature in legged locomotion of leg mechanisms with area contact and torque in the related joint.

During the swing phase the leg's spring-tendon network 22, 18 is disengaged and slack and the leg's joints become loose (see FIG. 4). The slack leg 10 state is cre-ated by designing the toe extending tendon(s) 30, the spring-disengagement tendon 36, the global spring-tendon 22, 18 and the leg flexing tendon 32 accordingly. Curling of the toe $s_5$ causes slack around its joint $j_3$. This propagates upwards (j2 to j0) as all joints are still coupled by the global spring-tendon 22, 18. It is desirable to flex (shorten) the leg 10 in the above slacked state during the swing phase.

First, a slack leg 10 in swing phase is energy efficient compared to flexing the leg while its extensor spring would be active. Second, a relaxed and slack global spring-tendon 22, 18 pulls the swing leg's segments into a curled posture with its toes pointing backwards (see FIG. 4). The curled toe/foot $s_5/s_4$ posture of the swing leg can prevent stumbling during locomotion compared to extended toes pointing forward.

It has been found that the transition from the stance to the swing phase requires to mechanically and forcefully disengage the leg's spring-tendon 22, 18 for "out of phase" gaits, like walking and slow running. This is especially important because disengagement must happen at a given time or a given leg angle. The disengagement mechanism has been utilized in walking gaits and for transition speeds between walking and running. A novel, distally located disengagement tendon 36 has been designed, which acts on joints $j_3$ and $j_4$ (FIG. 5). Disengagement tendon action is effectively powered by hip torque and hip angular movement acting on $j_0$, actuated by a hip angle motor 28.

Proper engagement and leg posture at the transition between the swing and stance phase is designed by two acting tendons—the global spring tendon 22, 18, which in this case is composed of two parts (FIG. 7) and the foot/toe extending tendons 38, 30. Timely movement of both distal segments is guided through a set of joint limiters 51, 52 and the calculated cam radii, two for c3 and one for c4.

Toe extension is guided by two extensor tendons 38, 30. These two extensor tendons 38, 30 are coupled to the foot joint $j_3$ and the toe joint j4 movement. Both tendons are individually adjustable in length 8, 9 (FIG. 7). Both tendons could be mounted spring loaded to reduce the effects of antagonistic action with the global spring-tendon 22, 18. However, for the shown gaits only the global spring-tendon 22, 18 is spring loaded.

At the end of the swing phase the ankle joint $j_2$ is extended, caused by gravity and inertia effects. This drops the lower part of the leg. Ankle joint extension can be supported by an extra tendon knee joint with leg protraction. Ankle joint j2 extension increases the tendon arc length of $j_2$ for the tendons 38, 30. First, tendon 38 extends segment $s_4$ over the joint arc of joint $j_3$. Tendon 30 is routed through the segment $s_4$. Set by its length, it extends segment $s_5$ after segment $s_4$ was extended by its tendon.

Effectively ankle joint extension (FIG. 4) extends segments $s_4$ and $s_5$ in a controlled manner. Control is provided by setting the slack tendon 30, 38 lengths.

In a robotic system an actuation (RC servo motors) and control and evaluation unit 42 (for example central pattern generators in feedforward mode) can be applied. With a feedforward control, a novel bipedal robot can walk and slowly run up to 0.9 m/s at a cost of transport of less than 2 J/(Nm). An example for a real application of a bipedal robot is shown in FIGS. 8 to 10.

The two robot legs 10 are connected via the trunk 24 which usually also includes the control and evaluation unit 42.

Such a robot can weigh about 1.7 kg which already includes all sensors. The robot has a standing height of about 0.29 m (FIG. 8 to 10). A COT lower than 2 presents a dramatic (>⅓) reduction in cost of transport compared to state of the art robots which had best values of about 6.6 J/(Nm).

An example for another application for such a robot leg 10 is shown in FIG. 11. Here two robot legs 10 are attached to a human body in order to help the human walk or for example to help the human carry heavy weights. The drawing on the right shows how the distance segment is rotated further than that of the foot in order to release the connecting tendon to produce the desired vertical movement of the foot.

Another example for a robotic system is shown in FIG. 12a. Here the robotic system comprises four robot legs 10 which are connected via the trunk 24. The system also comprises a control and evaluation unit 42, which usually is located in-side the trunk 24. The control an evaluation unit synchronizes the movements of each robot leg 10 in such a way, that the robotic system can walk or run just like a four legged animal would.

Another example for a robotic system is shown in FIG. 12b. The robotic system comprises is very similar to that shown in FIG. 12a and further comprises a sensor 44 at each of the four robot legs 10 which are connected via the trunk 24. The control and evaluation unit 42 is configured to control and actuate said actuators 20 present at each leg in dependence on parameters measured with said sensors 44. The movement of each robot leg 10 can thereby be carried out in an improved manner in comparison to the robotic system of FIG. 12a due to the use of the parameters measured by the sensors 44. This is because the sensors 44 enable a finer tuning of the movements of each of the robot legs 10. In this connection it should be noted that such fine-tuned robot legs 10 which mimic the movement of an animal, e.g. a leg of a bird, such as that of an ostrich, could be used to explain the precise movement patterns of certain animals e.g. in veterinary sciences.

REFERENCE SIGNS 8 leg length adjustment
9 leg length adjustment
10 robot leg
c, $c_0$-$c_4$ cams
j, $j_0$-$j_4$ joints
r, $r_0$-$r_4$ radius
s, $s_1$-$s_5$ segments
18 common tendon
20 actuator
22 spring
24 trunk load
26 center of pressure
28 motor
30 toe extending tendon
32 flexor tendon
34 further spring
36 disengagement tendon
38 extensor tendon
40 adjustment mechanism
42 control and evaluation unit
44 sensor
51 joint limit
52 joint limit

The invention claimed is:

1. A robot leg comprising at least two joints, each joint connecting two segments one to another, with each joint comprising a cam, the robot leg further comprising at least one actuator and a common tendon interconnecting each cam, wherein at least one cam is dimensioned such that its radius is smaller than a pre-defined threshold, with said pre-defined threshold being an equilibrium threshold for loading of the robot leg,
wherein the equilibrium threshold is defined as $F_c*r_c \propto F*d$, wherein F defines an overall force which acts on the robot leg, d defines a length of a virtual leg, $F_c$ defines a force which acts on the respective cam and $r_c$ defines a radius of the respective cam.

2. The robot leg in accordance with claim 1, wherein the at least one cam is a final cam.

3. The robot leg in accordance with claim 1, wherein at least some of the cams are linear cams.

4. The robot leg in accordance with claim 1, wherein all of the cams are linear cams.

5. The robot leg in accordance with claim 4, wherein a linear cam is a cam that has a center of rotation and a constant radius.

6. The robot leg in accordance with claim 1, wherein at least some of the cams enable a movement of the two segments adjoining each joint relative to one another.

7. The robot leg in accordance with claim 6, wherein the movement is a pivot movement between the two segments adjoining each joint.

8. The robot leg in accordance with claim 1, wherein the common tendon is formed by two or more part tendons, wherein two directly adjacent part tendons are respectively connected to the same one of the cams.

9. The robot leg in accordance with claim 8, wherein each directly adjacent part tendon is configured to produce a torque at each cam such that it is configured to straighten the two segments adjoining each joint relative to one another.

10. The robot leg in accordance with claim 9, wherein said joint extending torque is configured to counteract a load exerted on the overall length of the robot leg.

11. The robot leg in accordance with claim 1, wherein the at least one of the actuators is configured to bring about at least one of a movement and a force.

12. The robot leg in accordance with claim 1, wherein two actuators are provided including a first actuator comprising a spring and a second actuator comprising a motor.

13. The robot leg in accordance with claim 1, wherein the at least one of the actuators is a spring, and/or wherein the at least one of the actuators is a motor.

14. The robot leg in accordance with claim 1, wherein between two and eight joints are provided.

15. The robot leg in accordance with claim 1, wherein three or more joints are provided, a further actuator is provided that is arranged between two directly adjacent joints adjacent to the segment interconnecting said two directly adjacent joints.

16. The robot leg in accordance with claim 1, further comprising a further tendon, interconnecting the at least one cam with a last segment and the at least one cam having a radius at the pre-defined threshold of the series of cams.

17. The robot leg in accordance with claim 1, further comprising a control and evaluation unit and at least one sensor, with the control and evaluation unit being configured to control and actuate at least one of said actuators.

18. A robotic system with at least two robot legs, each robot leg comprising at least two joints, each joint connecting two segments one to another, with each joint comprising a cam, the robot leg further comprising at least one actuator and a common tendon interconnecting each can, wherein at least one cam is dimensioned such that its radius is smaller than a pre-defined threshold, with said pre-defined threshold being an equilibrium threshold for loading of the robot leg, the robotic system further comprising a control and evaluation unit, wherein the control and evaluation unit is configured to synchronize the robot legs in such a way, that a common locomotion of the robot legs is brought about,
wherein the equilibrium threshold is defined as $F_c*r_c \propto F*d$, wherein F defines the overall force which acts on the robot leg, d defines the length of the virtual leg, $F_c$ defines the force which acts on the respective cam and $r_c$ defines the radius of the respective cam.

* * * * *